United States Patent [19]

Teynor

[11] Patent Number: 5,305,183
[45] Date of Patent: Apr. 19, 1994

[54] PORTABLE PERSONAL COMPUTER WITH PASSIVE BACKPLANE HAVING A DOUBLESIDED STAGGERED CONNECTOR ARRAY

[75] Inventor: Richard R. Teynor, Pickerington, Ohio

[73] Assignee: Edison Welding Institute, Columbus, Ohio

[21] Appl. No.: 727,823

[22] Filed: Jul. 9, 1991

[51] Int. Cl.$^5$ ............................ H05K 7/10; H05K 7/16
[52] U.S. Cl. ................................. 361/686; 361/681; 361/683; 361/687; 219/130.01; 211/41
[58] Field of Search ............... 248/632, 634, 636, 638; 211/41, 26, 59.4; 361/390-395, 413, 415, 796, 797, 801-803, 679-687; 364/708, 708.1; 219/130.01

[56] References Cited

U.S. PATENT DOCUMENTS

| | | | |
|---|---|---|---|
| 3,177,404 | 4/1965 | Patmore | 361/415 X |
| 3,713,614 | 1/1973 | Taylor | 248/632 |
| 3,962,608 | 6/1976 | Forster et al. | 361/415 X |
| 4,268,100 | 5/1981 | Kekas et al. | 361/391 X |
| 4,736,332 | 4/1988 | Crease | 364/708 |
| 4,905,173 | 2/1990 | Bianco | 364/708 |
| 4,979,075 | 12/1990 | Murphy | 361/399 |
| 5,023,754 | 6/1991 | Aug et al. | 361/415 |
| 5,131,272 | 7/1992 | Minei et al. | 361/395 X |
| 5,159,528 | 10/1992 | Murphy | 361/390 X |

FOREIGN PATENT DOCUMENTS 387749 9/1990 European Pat. Off. ............ 361/415

OTHER PUBLICATIONS

"The Siemens Microcomputer Module System SMP80", Irmfried Bromme, components report XII (1977) No. 5, pp. 181-184, Nov., 1977.

Primary Examiner—Leo P. Picard
Assistant Examiner—Michael W. Phillips
Attorney, Agent, or Firm—Watkins, Dunbar & Pollick

[57] ABSTRACT

A portable personal computer that utilizes a combination of an open ended card cage and a passive backplane with a double-sided staggered array of connectors that allows for the horizontal placement of a large number of computer circuit boards in a low profile design as well as allowing easy access to the circuit boards for repair and replacement The open ended cage design also affords adequate cooling of the circuit components in the confines of a portable case. By hinging the card cage to the portable case, increased accessibility to the circuit boards is afforded. A welding data acquisition and control system embodiment is described that utilizes the portable computer for the acquisition of welding data for use in either operator or automated welding control. The system is capable of utilizing a wide range of welding programs for a wide rang of welding processes. The system is capable of utilizing analog and digital data inputs and can produce both analog and digital outputs for operator and automated welding process control.

30 Claims, 3 Drawing Sheets

PORTABLE PERSONAL COMPUTER WITH PASSIVE BACKPLANE HAVING A DOUBLESIDED STAGGERED CONNECTOR ARRAY

BACKGROUND OF THE INVENTION

1. Field of the Invention

This invention relates to a welding data acquisition and control system and more particularly to a portable, digital computer-based welding data acquisition and control system using a passive backplane with staggered connectors on both sides of the backplane that receive and hold circuit boards onto which the central processing unit and other components of a digital computer are mounted and which provide for the use of operator and sensor input for monitoring the welding process and operator and automated control output for use by the operator or for direct control of the welding process.

2. Background

The use of computers for the input and control of the welding process is known in the art. Such use includes those applications where the computer is used to monitor one or more input variables and provide data to an operator to change the welding process Other use includes applications where the computer is used not only to monitor one or more input variables but also to automatically control the welding process.

Illustrative of computer use to monitor input data and provide the operator with data on the welding process include the following.

U.S. Pat. No. 4,996,409 to Paton et al. discloses the use of a computer to monitor the voltage, current, welding speed, feed rate and slope of the electrode in an arc welding process which data is processed with a resultant output of audible signals that provide information to the operator of incremental changes in the monitored parameters. U.S. Pat. No. 4,375,026 to Kearney discloses voltage, current and travel speed sensors that are compared with reference data using analog computer modules to set off high or low alarms. U.S. Pat. No. 4,555,614 to Morris et al. discloses a speed and temperature sensor that is processed by a computer and compared with acceptable rates of change of weld temperature. A light indicator in the operator's helmet indicates to the operator whether the speed of the welding torch is too slow, within range, or too fast so that the operator can adjust the speed accordingly.

UK Patent Application GB 2,173,316 A to Brown discloses a welding monitor for monitoring voltage, current, gas flow or wire feed speed and comparing them with predetermined values to indicate by means of light emitting diodes when the process is within acceptable ranges of the monitored variables.

Patents illustrative of the use of computer processing to monitor input variables and automatically control the welding process include:

U.S. Pat. No. 4,187,020 to Chande et al. uses an IBM PC/AT computer for determining cooling rates to effect control of a robotic and laser controller. This system also employs a seam tracking/imaging processing module to control movement of a robotic arm. U.S. Pat. No. 4,651,283 to Sciaky et al. discloses a computer system for determining the special coordinates of a work piece which in turn is used to control the position of a welding device. U.S. Pat. No. 4,490,795 to Calcagno shows an apparatus for monitoring current, voltage and firing angle of a welding gun to automatically control various parameters of the welding process including the firing angle and the number of cycles of the welding process.

U.S. Pat. No. 4,482,798 to Hurlebaus et al. describes an automatic electric welding system that uses welding speed, current and voltage in combination to produce an electrical signal that is used to control a variable of the welding operation, for example, the wire feed rate. U.S. Pat. No. 4,258,425 to Ramsey et al. describes a computer driven apparatus that senses the seam contour of a part and then is able to control the position of an arch welder along the seam contour of a similar part. U.S. Pat. No. 4,104,724 to Dix et al. discloses a digital welder control system that provides diagnostics or common welding problems such as half-cycling, low water flow, etc. as well as a compensator control to automatically increase weld heat to compensate for electrode mushrooming. U.S. Pat. No. 4,063,075 to Collom uses a minicomputer to monitor and control a large number of welding heads. U.S. Pat. No. 4,024,371 to Drake shows a monitoring and control system for a pulse-type welding that senses voltage and current in order to control the welding process by shortening or lengthening the heating or cooling cycles.

Typically such computer driven processes have used computer systems that are bulky and unsuitable for field operations such as pipeline, plant and building construction and modification, and welded part diagnosis and repair. Furthermore, the rapid change in computer and associated component technology requires that all components of a computer system including the central processing unit be easily interchangeable and upgradeable to take maximum advantage of changes and improvements in welding technology. These problems are only beginning to be addressed in the welding filed although some development has occurred in other areas. For example, in reducing the size of a retail, point of sale, terminal, Landis et al (U.S. Pat. No. 4,901,205) uses a bus board to provide communication between a processor board and additional circuit boards that are placed in a staggered configuration on opposite sides of the bus board Such a configuration allows for a smaller electronic enclosure The Landis bus board serves as a data bus between peripheral circuit boards which are plugged into the bus. However, the Landis design hinders plugging the bus board into the processor board socket in view of the obstruction of the view of the mating of the bus board and the processor socket by the sides of the cabinet housing. Furthermore the Landis configuration does not allow for ready replacement of the main processor or other circuit boards nor does it insure adequate cooling of the various component parts.

U.S. Pat. No. 4,498,717 to Reimer discloses a circuit board interconnect arrangement in which some of the wiring boards are staggered in alternating positions on either side of an interconnect plane. In addition, Reimer requires the use of backplanes and cross-connect boards in a complex arrangement.

U.S. Pat. No. 4,834,660 to Cotti discloses a zero-insertion forces interconnect system for intended circuit boards. U.S. Pat. No. 4,708,660 to Claeys et al. discloses a connecting device for electrically and mechanically linking multiple circuit boards arranged into perpendicular stacks. U.S. Pat. No. 4,818,241 to Smoot discloses two sets of circuit boards that are aligned in right angles to each other by means of a circuit board edge connector that utilizes alternating conductive and nonconductive segments.

As is apparent from the above discussion, a wide variety of computer-controlled systems have been developed to monitor and control welding operations To date, these systems have been essentially dedicated systems for controlling specific welding operations using methodologies that are directed to a particular type of welding or a particular variable in the welding process. Calcagno has made some effort to use a computer system in providing a more generalized welding system; however, even the Landis invention is limited to sixteen welding programs that control a limited number of parameters in single-phased resistance welding application using one or two guns controlled by a group of static switches.

Some effort has been made in reducing the size of enclosures for personal computers while allowing the continued use of standard plug-in boards as exemplified by Landis et al. However, even Landis is directed to a specific application, i.e., a compact, computer housing that plugs into a point-of-sale unit. Furthermore the Landis housing does not allow for ready cooling or easy accessibility when placed in a portable carrying case.

None of the above references suggest a portable welding data acquisition and control system for field use. Nor do they suggest the use of a wide range of operator and sensor inputs as well as a wide range of operator and automated control outputs that are applicable to a wide range of welding processes including robotic operations. As a result, none of the prior art devises afford or suggest a portable welding unit with a multitude of operator and sensor inputs and operator and automated control outputs that are applicable to a wide variety of welding operations including robotic welding not currently available for field use.

SUMMARY OF THE INVENTION

The present invention solves the various problems of the prior art by combining into a single portable unit the capabilities for the precise control of a variety of welding operations that goes beyond that which has been heretofore known in field-oriented welding requirements. The present invention uses the flexibility and interchangeability of the components of a personal computer while reducing the size of such an assembly to such a degree as to allow placement into a portable case while maintaining adequate cooling and easy accessibility. Not only does the present invention reduce the size of the personal computer but provides for a wide variety of operator and sensor inputs as well as operator output and outputs for automated control of the welding process in a wide variety of welding applications including robotic applications which have heretofore been unknown in field welding operations.

The present invention is a computer-based, welding data acquisition and control system contained in a portable case which is small enough and light enough to qualify as carry on luggage on most airlines. All of the component interchangeability and computer power associated with larger IBM-type personal computers are incorporated into the present system by using a passive backplane with backplane connectors located on both sides of the backplane in a staggered array. That is, assuming the backplane is in a vertical position and that a first connector is located at the bottom of the first or front side of the backplane, then the second connector is located on the other, second or back side of the backplane slightly above the first connector, the third connector is located above the second connector but on the first side, and so forth.

The backplane is a passive backplane which for the purposes of this patent is defined as a circuit board devoid of logic circuits. Circuit means is provided for connecting the backplane connectors to each other and to other components of the system. A plurality of circuit boards having a connection means on one edge engage the backplane connectors so that the circuit boards are perpendicular to the backplane and parallel to each other.

Means is provided for mounting the backplane into the portable case as well as for supporting the associated circuit boards. A preferred method for mounting the backplane and supporting the circuit boards uses a card cage. The card cage is essentially a box (housing) with a top, a bottom, a first side and a second opposing side, and two opposing opened ends The passive backplane is secured to the top and bottom of the card cage so that the front (first) side and the back (second) side of the passive backplane are essentially parallel to the open ends of the housing with the backplane connectors horizontally disposed on the backplane. This allows the circuit boards to be readily inserted into the circuit board connectors from each of the open ends of the card cage housing and allows for the free passage of air through the card cage to insure adequate component cooling. Hinging the card cage housing to the portable case, as, for example, to the lip at the upper edge of the bottom section of the case, allows easy access to the circuit boards for replacement and repair.

A preferred method of securing the backplane to the top and bottom of the card cage housing utilizes selfadhesive, foam-backed card guides. The combination of foam tape and a card guide absorbs shock thereby reducing backplane, circuit board, and backplane connector damage caused by jarring, dropping and other hard use encountered under harsh field conditions.

The edges of the circuit boards that are adjacent to the first and second opposing sides of the card cage housing are suitably secured to the first and second sides of the card cage housing. A preferred method of doing takes advantage of the construction of de facto standard IBM-type circuit boards. This is done by forming a lip that is bent outwardly at a right angle to the first side of the housing at both ends of the first side of the housing. A plate secured at a right angle to a second edge of the circuit board is located adjacent to the first side of the card cage housing. The plate has a tab at one end that is bent away from the card at a right angle so as to overlap the lip at the end of the first side of the housing. The tab is secured to the lip by means such as a screw or bolt that is screwed into a threaded hole in the lip through a hole in the securing tab. This securing method is well known in the art and is further illustrated in U.S. Pat. No. 4,901,205 to Landis et al which is herein incorporated by reference in its entirety.

With the exception of various process sensors including transducer type sensors and process control output means, all of the essential components of a programmable digital computer are placed within the portable case. Although it is possible to include specific sensors, output control devices and a printer into the portable case, this tends to limit the flexibility of the system. As such, suitable connectors are provided in the case for connecting process sensors, process control output, and a printer to the otherwise self-contained computer.

The present system accommodates both analog and digital input and output means. Analog to digital and digital to analog conversions means are provided as well as signal conditioning and signal isolation which minimizes external noise effects and extraneous current and voltage spikes from the welding process and other sources.

The central processing unit (CPU) of the computer is contained on one or more of the circuit boards that is plugged into the backplane and held in place by the card cage. A single board computer allows the user to easily fix or upgrade to a more powerful computer when necessary. Typically a single board computer will also contain random access memory and keyboard and speaker interfaces.

Various operator input means such as a keyboard and a touch screen interface are included in the case. A connection for a mouse is also provided. Operator output means such as a video display, a sound device, and even a printer can be mounted into the case and attached to the central processing unit.

Various media storage means including random access memory, disk drives, hard drives and optical disk drives may be mounted in the portable case and connected to the central processing unit. Programming means for operating the computer as well as application programs can be placed on a hard, floppy, or optical disk. Alternatively, the operating and application programs can be placed on EPROM (extended programmable read only memory) or ROM (read only memory) although the later tends to limit the flexibility of the system.

The system has a means for connecting the computer to a power source and this means may include an auto sensing and auto switching means to adjust to various power supplies found throughout the world. A means is provided for cooling the computer that includes a fan and suitable venting apertures to allow cooling air to pass through and among the various components. The open ended card cage of this invention is especially notable in this respect in that it allows ample circulation through and among the various components that are mounted on the circuit boards.

The foregoing and other advantages of the invention will become apparent from the following disclosure in which one or more preferred embodiments of the invention are described in detail and illustrated in the accompanying drawings It is contemplated that variations in procedures, structural features and arrangement of parts may appear to a person skilled in the art without departing from the scope of or sacrificing any of the advantages of the invention.

In describing the preferred embodiment of the invention which is illustrated in the drawings, specific terminology is resorted to for the sake of clarity However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 1:
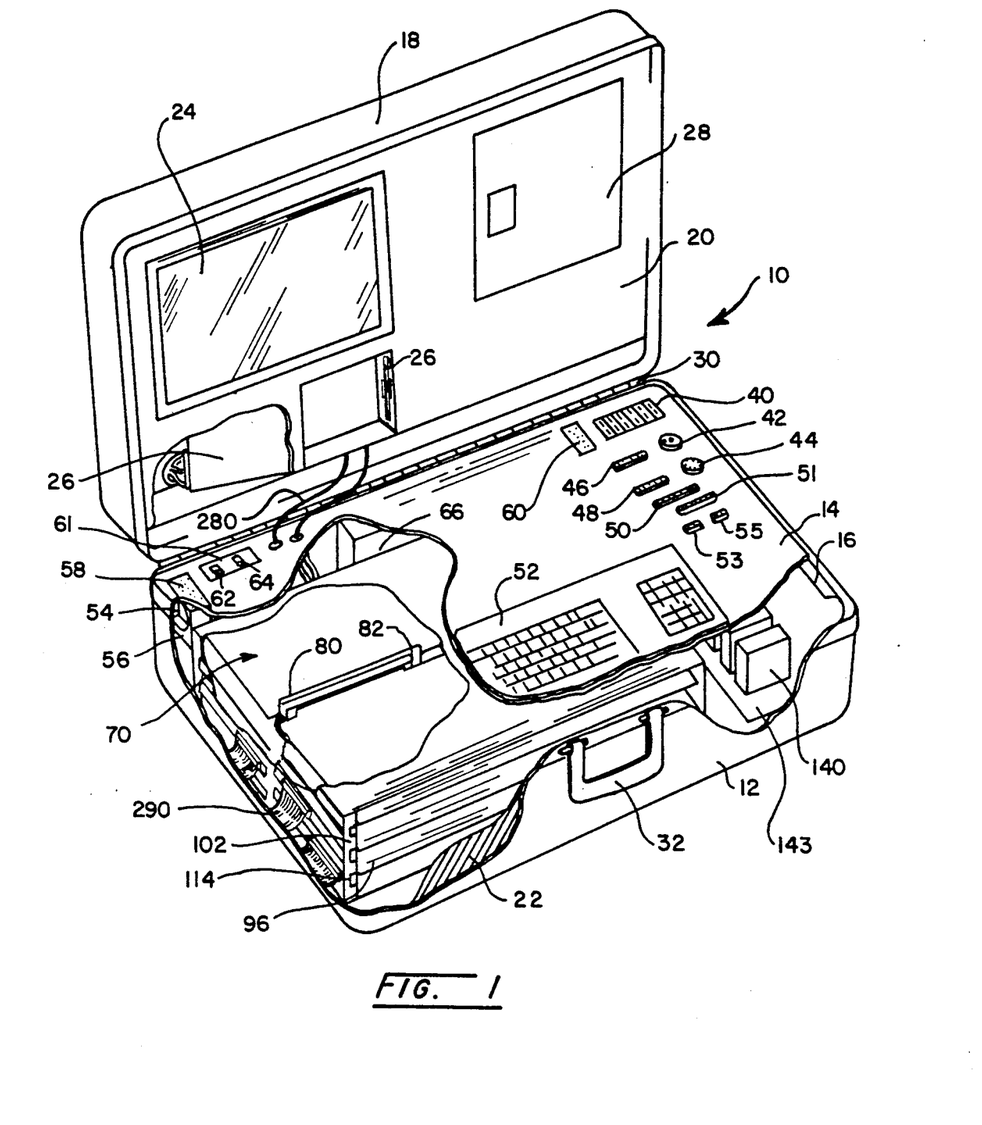
FIG. 1 is a partially broken away perspective view showing the arrangement of various components of the present invention in a portable case.

As shown in FIG. 1, this invention is contained in a portable carrying case 10 that has a base section 12 that is enclosed by a base lid 14 that is secured to the base section 12 by means of valence (lip) 16 and a lid section 18 that is enclosed by lid 20. The lid section 18 is joined to the base section by means of a hinge 30. A handle 32 which is joined to the base section 12 facilitates movement of case 10. The case 10 is about 20.5 by 15 by 9 inches giving 44.5 total linear inches which meets Federal Aviation Administration (FAA) guidelines for carry-on luggage for under seat or over head storage.

Case 10 is shielded from electromagnetic interference and radio frequency interference (EMI/RFI) by shielding 22 which is a material such as heavy gauge, adhesive-backed aluminum foil. In addition, case 10 is environmentally hardened, that is, it is made and conditioned to exclude moisture, dust, dirt, oil, grease, water and other contaminants that effect the performance of various system components. A suitable case 10 is the 2H2014P-060 made by the S.K.B. Corp. of Orange, CA.

The lid section 18 contains a video display and input device 24 such as the Touch Panel Display Device PN-TF made by Planar Systems, Inc. of Beaverton, OR. This device incorporates a flat video display along with the capability to select various program options and parameters by touching various parts of the video display screen. The lid 18 includes one or two floppy disk drives 26 such as a 3.5 inch 1.44 megabyte drive from the Chinon Corp. of Japan. A door 28 leads to a storage compartment useful in the storage of input sensors, cables, and other items associated with the use of the system. Alternatively, a small printer 208 (FIG. 3) may be incorporated into the space occupied by the storage compartment. A small speaker 212 (FIG. 3) can also be mounted to the lid 20.

A keyboard 52 and various input and output connectors are mounted to the lid 14 of base section 12. The keyboard 52 is environmentally hardened to protect its, from spills, dirt, and other adverse conditions found in a welding environment. A suitable keyboard is the TKP-1 from ISI Manufacturing, Inc. Fraser, MI. The various input and output connectors include connectors 40 which are six individual thermocouple connectors model SMP-K-MF made by Omega Engineering of Stamford, CT. These connectors typically have two conductors and are readily useable with a wide variety of thermocouple sensors. Connector 42 is a voltage input connector made by Allied Corp. (Amphenol) of Oak Brook, ILL having two connectors and is readily useable with a wide variety of voltage inputs. Connector 44 is a 6 pin voltage input connector for the voltage output from a hall-effect current detector. Connector 46 is a 25 socket output connector for a parallel printer Connector 48 is a 25 pin serial output connector for connection to an external serial device such as a mouse 260 (FIG. 3), a plotter, etc. Connector 50 is a 37 socket auxiliary input/output connector used for a variety of input or output purposes including auxiliary analog I/O, digital I/O and countertimer I/O. Connector 51 is a 25 socket input/output connector for a tape backup. Connector 53 is a socket connector for a position sensor. Connector 55 is a 9 socket connector for a wire feed spread sensor.

A cooling assembly consisting of a motor 56, fan 54 and an exhaust port 58 such as model number 031101 made by Comair-Rotron of Saugerties, NY provides adequate ventilation of the system components. Air is drawn into the lower case through air inlet 60 and is routed over and among the various components by a baffle system (not shown). A similar cooling assembly (not shown) is used in the lid section 18.

A power switch model 61 has an alternating current (AC) input pin connector 64 with a rocker switch 62 rated at 6 amps AC and an integrated EMI/RFI filter The power supply 66 for the system is an auto-sensing power supply such as a model MAP-130-4000 from Power One of Camarillo, CA. All components installed into the system case 10 are direct current (DC) driven. The only alternating current (AC) device is the power source. The auto-sensing power source enables the system to utilize AC line voltages from 90 to 230 volts and line frequencies from 47-63 hertz without effecting the DC supply to the components. The auto-sensing feature enables the system to be used internationally, even in countries with an unstable AC line.

The core of the system is the passive backplane 80 and its associated card cage 70 which are contained in the base section 12 The card cage 70 is fastened to the base section 12 by means of a hinge 73 (FIG. 2) that is fastened to the valence 16 of the base section 12. Alternatively the card cage can be fastened to the underside of lid 14 which in turn is hinged to valence 16.

Figure 2:
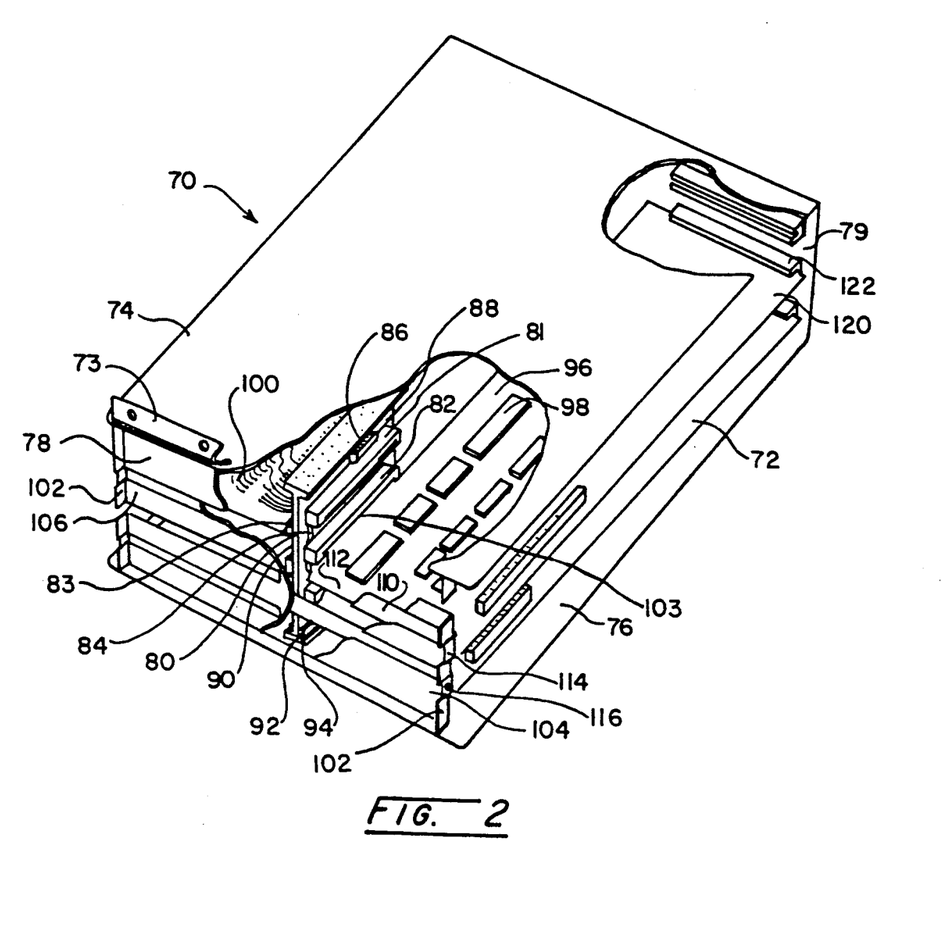
FIG. 2 is a partially broken away perspective view of the cage for the passive backplane and associated circuit boards.

As seen in FIG. 2, the passive backplane 80 has a plurality of backplane connectors 82 alternatingly mounted on a first side 88 and a second side 90 of the backplane 80 in a staggered array one to the next. Thus the first connector 81 is mounted on the first side 88 and at the top of backplane 80. A second connector 83 is mounted on the second side 90 of the backplane slightly below the first connector 81. A third connector 82 is mounted on the first side 88 of the backplane 80 slightly below the second connector 83. Subsequent connectors are mounted in a similar alternating fashion. Although the backplane connectors have been labeled 81-83 for the purposes of this discussion, it is to be understood that they may be the same or different. In subsequent discussion, the backplane connectors are referred to only by the numeral 81. For the purposes of the present application, the backplane connectors are sets of 36 pin and 62 pin connectors. Circuit means 84, essentially a printed circuit, is provided for connecting the backplane connectors (81-83) to each other. A power supply connector 86 is also attached to the circuit means 84 of the backplane 80 to provide a means for connecting the backplane to power supply 66. The passive backplane 80 is essentially a printed circuit board without logic circuitry.

The passive backplane 80 is secured in card cage 70 which is essentially a box or housing with two opposing open ends 72. The housing consists of a top 74, a bottom 76, a first side 78, and an opposing side 79. The passive backplane 80 is secured in the card cage 70 by means of card guides 92 with a foam-backed self adhesive 94 that are mounted on the interior side of the top 74 and bottom 76 of the card cage so that the backplane 80 is vertically disposed with the first side 88 and the second side 90 being essentially parallel to the opposing open ends 72 of the card cage 70.

Circuit boards 96 with associated components 98 and circuitry 100 have a connection means at an edge 102 adapted to engage the horizontally disposed backplane connectors 81-83. When the circuit boards 96 are engaged in the backplane connectors 81-83, they are perpendicular to the backplane and parallel to each other and to the top and bottom of the card cage.

The circuit boards used in this invention are essentially IBM-PC/AT compatible circuit boards. To accommodate such boards, a lip is formed at the ends 104 and 106 of the first side 78 of the card cage housing 70 by bending a portion of side 78 outward so that the lip 102 is at a right angle to side 78. A plate 110 secured at a right angle to a second edge 112 of circuit board 96 is adjacent to the interior of side 78 is secured to lip 102 by means of a tab 114 formed from the plate 110 by bending a portion thereof outwardly at a angle. Tab 114 is secured to lip 102 by means of a fastener such as a screw 116 A third edge 120 of the circuit board 96 is held in place by means of a 122 secured to the second side 79 of card. The alternating arrangement of the backplane connectors 81-83 on both sides of the backplane (88 and 90) allows for the insertion of circuit boards 96 from either end 72 of the card cage 70 in a horizontal plane that is conducive to a low profile design which allows incorporation into an attache style case 10. The open ends 72 of the card cage 70 allow for ample cooling of the circuit board wiring 100 and components 98.

Various system components are placed on the circuit boards 96. One feature of the present design is the elimination of a mother board on which the central processing unit (CPU) 225 and other components are located. In the present design, a single board, programmable, digital computer, such as the B386s CPU made by Texas Microsystems of Houston, TX resides in one of the backplane connectors 81-83. A single board computer design allows for easy maintenance or upgrade to a more powerful computer when necessary Rando memory 250 (FIG. 3), the keyboard interface, and a speaker interface also reside on the CPU board. A hard disk 200 (FIG. 3) and associated drive unit on a circuit board or card 96, i.e., a "hardcard," such as a 40 megabyte model from Plus Development resides in another backplane connector. The "hardcard" hard disk is used to take advantage of its space saving design and impact resistance to shock and vibration. An optical disk 204 may also used with the present system.

A multi-function input/output (I/O) board 96, such as a JE1077 from Hameco Electronics, Belmont CA is positioned in another backplane connector 81. It is used to control the floppy drive 26, a parallel port (connector) 46 for a printer, two serial ports—one going to the touch screen 25 and the other to connector 48 for a serial device such as a mouse 260.

A video adapter board 96 such as from Planar System Inc. of Beaverton, OR another backplane connector 81 and drives the flat panel display 24. Another I/O board 96 resides in another backplane connector 81 and provides the capability of acquiring data and controlling processes. Such a board is the MIO-16 which is capable of handling 16 analog inputs, 2 buffered analog outputs, 8 digital inputs or output and three counter-timer functions The analog inputs and outputs and the digital I/O capabilities along with the counter-timer inputs make the system well suited for welding data acquisition and control of the welding process.

Figure 3:
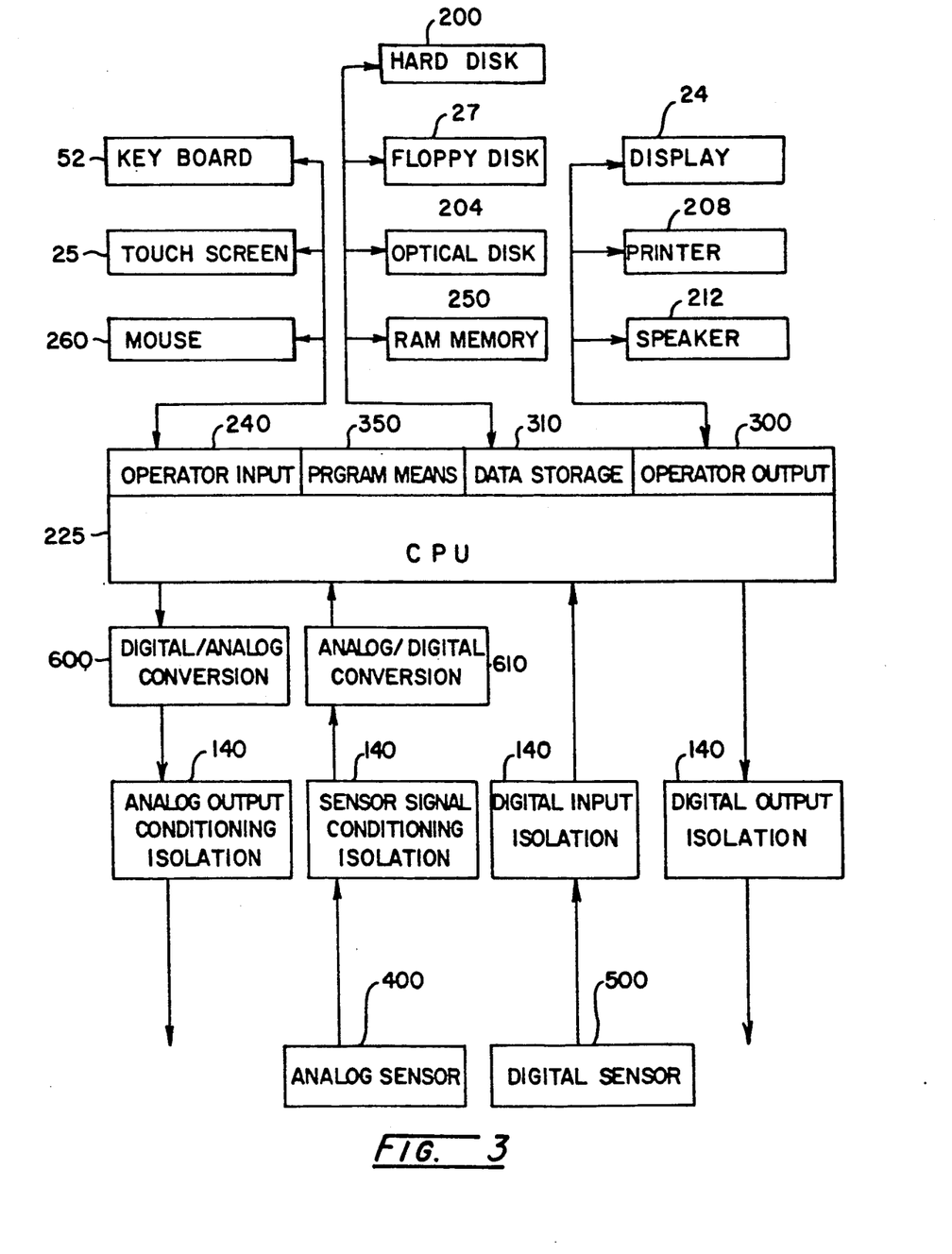
FIG. 3 is a block diagram of various components of the computer system of the present invention.

FIG. 3 is a block diagram showing the interrelation of the various components of the present invention. As noted previously, the CPU 225 is placed on a circuit board 96 to allow for easy access for repair and upgrade to more powerful logic circuits rather than using a more conventional mother board approach.

The CPU 225 is linked to a number of operator inputs 240 such as a keyboard 52, a touch screen 24 and a mouse 260. The keyboard 52 and the touch screen are incorporated directly into the portable case 10 and are connected to the CPU 225 by suitable connectors such as cabling 280 and 290.

Similarly the CPU 225 is linked to operator outputs 300 such as a video display device 24, a printer 208 and a speaker 212. The CPU is also linked to suitable data storage means 310 including random access memory 250 and other data storage means such as a hard disk 200, a floppy disk 27 and even an optical disk 204.

Finally, program means 350 including operating system and application programs serve to provide instructions to the CPU covering the operation of the system and the processing of input data. As noted, a wide variety of operator input devices 240, operator output devices 300, data storage 310 and program means 350 can be used with this system. In its basic configuration, the system uses an Intel 20MHz 80286 CPU 225, 1 megabyte of RAM 250, a 40 megabyte hard disk 204, 3½"1.44 megabyte sloppy disks 27, and an environmentally hardened keyboard 52.

Because of the use of the readily accessibly circuit board 96 for the CPU 225, it can be conveniently upgraded to an Intel 80386 or 80486 CPU and a math coprocessor added. The system is readily upgradeable to 16 megabytes of RAM 250, an 80 megabyte hard disk 200, and a touch screen interface 25. The serial connector 48 can be used to attach an external modem.

In addition, the system allows for a wide variety of analog sensor 400 and digital sensor 500 input All inputs and outputs for data acquisition and process control are isolated by means of isolation modules 140 to prevent damage to the computer components by spurious voltage and current spikes A circuit board 143 (FIG. 1) contains the various isolation/conditioning modules 140.

Analog inputs are converted to digital inputs by means of conversion circuitry 610 located on a circuit board 96. Correspondingly digital outputs are converted to analog outputs by conversion circuitry 600. The modules are easily replaceable for reconfiguration or repair. Modules used in this invention such as the 5B47K04 for K-type thermocouples, the 5B41-03 voltage input module for current, wire feed and position, and the 5B40-03 millivolt input module for millivolt input devices are from Analog Devices, Boston, MA. All modules reside in a backplane such as the 5B-01 from Analog Devices, Boston, MA.

EXAMPLE OF WELDING DATA ACQUISITION AND CONTROL

The following example written in conjunction with FIG. 3 illustrates the use of the present invention and a data acquisition and control program 350 such as Lab-Tech NoteBook from Laboratory Technology to control a field welding process in real time.

In the gas metal arc welding (GMAW) process, it is often important to prevent burning the metal through from the welded side of the material to the back side of the material, that is, it is critical to control the degree of weld penetration. In order to do this, the operator must have data on the thickness, melting temperature, joint configuration and fit-up of the material to be welded Such data can be entered into the program means 350 via a keyboard 52 or recalled from stored data on previous welds and used to calculate a burn through temperature profile for the backside of the weld.

The temperature on the backside of the weld is read using an analog sensor 400 such as an infra-red detector or appropriate thermocouples such as K-type thermocouples placed in strategic positions that are in intimate contact with the material to be welded. Analog sensors 400 are also used to obtain voltage and current data from the welding power supply. The current data is obtain using an analog sensor (transducer) 400 such as a CT-3474CS615 from Ohio Semitronics, Inc. Columbus, OH. The data signal from this Hall-effect transducer is feed into an isolation and signal conditioning module 140 such as an 5B41-03 module from Analog Devices, Boston MA. The resulting data is then routed into a analog input channel on an I/O circuit board 96 such as the MIO-16 from National Instruments, Austin, TX where it is converted from analog to corresponding digital data for program 350 processing by the CPU 225. The voltage sensor 400 samples the voltage of the welding power supply and divides it using a 10 to 1 voltage divider after which it is routed through an isolation and conditioning module 140, an analog to digital conversion process, and then to the CPU for further processing in a manner similar to the current data. The K-type thermocouple wires are held in intimate contact with the back of the material to be welded. The small electrical signal from the thermocouples are input to a K-type thermocouple isolation and conditioning module such as the 5B47K-04, from Analog Devices, Boston MA and then follows a path to the CPU 225 that is similar to that for the voltage and current data.

Using a suitable program means 350 such as the data acquisition and process control application program, LabTech Notebook, from Laboratory Technology Instruments, a simple feedback and control program can be selected using a suitable operator input means 240 such as the keyboard 52 or the touch screen 25. Similarly, temperature limits for the backside of the fixture and current and voltage limits can also be input.

The temperature from the thermocouple is compared with the acceptable temperature limits as the welding process progresses. The voltage and current are also continually monitored during welding process and compared to the set limits in the program.

An analog input to the welding power supply is used to control current. Thus as a result of continuous calculation and comparison of the backside fixture temperature and the current and voltage of the welding power supply with set temperature, current and voltage limits, the CPU 225 can send out a digital output for control of the welding power supply. The CPU output is converted from digital to analog form by a digital to analog convertor module 600 on one of the circuit boards 96. It is then conditioned and isolated in an output module 140 such as a 5B31-03 module from Analog devices, Boston MA. The signal is sent to the welding power supply to correct appropriately the welding power output.

The process continues under program 350 control until terminated by a loss of analog sensor input 400 or by operator action through suitable input means 240 such as the keyboard 52 or touch screen 25. In addition, welding data can be recorded on suitable data storage means 310 for later analysis in determining the effects of temperature, current and voltage on the quality of the weld and for use in later welding operations.

It is possible that changes in configurations to other than those shown could be used but that which is shown if preferred and typical Without departing from the spirit of this invention, various means of fastening the components together may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A portable, personal computer system comprising:
   a. a portable, carry-on luggage case comprising;
      1) a base section;
      2) a lid section;
      3) means for joining said base section and said lid section to form said portable case and to allow easy access to computer components mounted therein;
      4) means attached to said portable case for carrying said case;
   b. operator input means mounted in said portable case;
   c. operator output means mounted in said portable case;
   d. a passive backplane mounted in said case and having a first side and a second side;
   e. a plurality of backplane connectors alternatingly mounted on said first side and said second side of said backplane in a staggered array one to the next;
   f. circuit means for connecting said backplane connectors to each other;
   g. a plurality of circuit boards each having connection means at one edge thereof adapted to and engaged in said backplane connectors so that said circuit boards are perpendicular to said backplane and parallel to each other.
   h. means for mounting said backplane in said portable case and means for supporting said circuit boards;
   i. a programmable, digital computer contained in said portable case, said computer comprising:
      1) a central processing unit mounted on at least one of said circuit boards;
      2) connection means for linking said operator input means to said central processing unit;
      3) connection means for sensor input means connected to said central processing unit;
      4) connection means for linking said operator output means to said central processing unit;
      5) media storage means including random access memory connected to said central processing unit; and
      6) program means for programming said central processing unit;
   j. means for connecting said computer to a power source; and
   k. means for cooling said computer contained in said portable case.

2. The portable, personal computer system of claim 1 with said means for mounting said backplane in said portable case and supporting said circuit boards comprising:
   a. a card cage comprising a housing having a top, a bottom, a first side and an opposing side and two opposing open ends wherein said passive backplane is mounted to said top and said bottom of said housing so that said backplane connectors and said circuit boards are horizontally disposed; and
   b. means for attaching said card cage to said portable case.

3. The portable, personal computer system of claim 2 wherein said means for attaching said card cage to said portable case is a hinge.

4. The portable, personal computer system of claim 2 wherein said passive backplane is mounted to said top and bottom of said housing using self-adhesive, foam-backed card guides.

5. The portable, personal computer system of claim 2 further comprising first means for securing a second edge of said circuit boards to a first side of said card cage housing and a second means for securing a third edge of said circuit boards opposite said second edge to a second side of said card cage housing.

6. The card cage of claim 2 with:
   a. said first side of said housing further comprising a lip bent outward to form a right angle at a first end and a second end of said first side of said housing;
   b. a plate secured at a right angle to a second edge of said circuit boards so as to be adjacent to said first side of said housing, said plate having a tab at one end thereof bent at a right angle so as to overlap said lip of said first side of said housing; and
   c. means for securing said tab to said lip.

7. The card cage for electronic components of claim 6 wherein said third edge of said circuit board opposite said second edge is supported on said second side of said housing means of a self-adhesive, foam-backed card guide.

8. The portable, personal computer system of claim 1 wherein at least a part of said circuit means for connecting said connectors is a printed circuit.

9. The portable, personal computer system of claim 1 further comprising output control means connected to said central processing unit.

10. The portable, personal computer system of claim 9 with said output control means comprising an analog output control means.

11. The portable, personal computer system of claim 10 with said analog output control means comprising at least two separate analog outputs.

12. The portable, personal computer system of claim 10 further comprising a digital to analog conversion means interposed between said analog output control means and said central processing unit.

13. The portable, personal computer system of claim 12 further comprising an isolation barrier interposed between said digital to analog conversion means and said analog output control means.

14. The portable, personal computer system of claim 1 further comprising an isolation barrier contained in said portable case and interposed between said connection means for said sensor input means and said central processing unit.

15. The portable, personal computer system of claim 1 with said sensor input means comprising an analog sensing means.

16. The portable, personal computer system of claim 15 with said analog sensing means comprising at least eight separate analog inputs.

17. The portable, personal computer system of claim 15 further comprising an analog to digital conversion means interposed between said input connection means and said central processing unit.

18. The portable, personal computer system of claim 17 further comprising an isolation barrier interposed between said connection means for said sensor input means and said analog to digital conversion means.

19. The portable, personal computer system of claim 1 with said input means comprising a keyboard.

20. The portable, personal computer system of claim 1 with said output means comprising a video display.

21. The portable, personal computer system of claim 20 with said data input means comprising a touch screen interface mounted on said video display.

22. The portable, personal computer system of claim 1 with said output means comprising a flat video display terminal.

23. The portable, personal computer system of claim 1 with said media storage means comprising a floppy disk drive.

24. The portable, personal computer system of claim 1 with said media storage means comprising a hard disk drive.

25. The portable, personal computer system of claim 1 with said media storage means comprising a optical disk drive.

26. The portable, personal computer system of claim 1 with said media connecting means for connecting said computer control system to a power source comprising an auto-sensing means.

27. The portable, personal computer system of claim 1 with said input means comprising a mouse.

28. The portable, personal computer system of claim 1 with said output means comprising a printer.

29. The portable, personal computer system of claim , said portable case is environmentally hardened.

30. The portable, personal computer system of claim 1 with said portable case further comprising electro-magnetic interference and radio-frequency interference shielding.

* * * * *

UNITED STATES PATENT AND TRADEMARK OFFICE
CERTIFICATE OF CORRECTION

Page 1 of 2

PATENT NO. : 5,305,183
DATED : April 19, 1994
INVENTOR(S) : Teynor

It is certified that error appears in the above-identified patent and that said Letters Patent is hereby corrected as shown below:

Title page, item [57],
Abstract, line 16, "rang" should read "range"
Column 1, line 25, "process" should read "process."
Column 2, line 36, "filed" should read "field"
         line 43, "board" should read "board."
         line 44, "enclosure" should read "enclosure."
Column 3, line 5, "operations" should read "operations."
Column 4, line 19, "ends" should read "ends."
Column 6, line 55, "its" should read "it"
         line 66, "ILL" should read "IL"
Column 7, line 23, "filter" should read "filter."
         line 37, "12" should read 12."
Column 8, line 11, "102" should read "103"
         line 26, "at a angle" should read "at a right angle"
         line 27, "means of a fastener" should read "means of a suitable fastener"
         line 28, "116" should read "166."
         line 29, "means of a 122" should read "means of a card guide 122"
         lines 29-30, "side 79 of card" should read "side 79 of a card cage 70."
         line 47, "necessary" should read "necessary."
         lines 47-48, "Rando memory" should read "Read access memory--.
         line 56, "may also used" should read "may also be used"
         line 64, "as from Planar System" should read "as the FPC-AT Planar System"
Column 9, line 3, "inputs or output" should read "inputs or outputs"
         lines 3-4, "functions" should read "functions.*
         line 45, "input" should read "input."
         line 49, "spikes" should read "spikes."
Column 10, line 10, "welded" should read "welded."
         lines 21-22, "data is obtain" should read "data are obtained"
         line 68, "from Analog devices," should read "from Analog Devices,"

UNITED STATES PATENT AND TRADEMARK OFFICE
CERTIFICATE OF CORRECTION

PATENT NO. : 5,305,183
DATED : April 19, 1994
INVENTOR(S) : Teynor

It is certified that error appears in the above-indentified patent and that said Letters Patent is hereby corrected as shown below:

Column 11, line 13, "typical" should read "typical".

Signed and Sealed this

First Day of November, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,305,183
DATED     : April 19, 1994
INVENTOR(S) : Teynor

It is certified that error appears in the above-indentified patent and that said Letters Patent is hereby corrected as shown below:

Column 8, line 28, "116" should read --116.--

Signed and Sealed this

Third Day of January, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,305,183

DATED : April 19, 1994

INVENTOR(S) : Teynor

Page 1 of 2

It is certified that error appears in the above-identified patent and that said Letters Patent is hereby corrected as shown below:

Title page, item [57], Abstract, line 16, "rang" should read "range"
Column 1, line 25, "process" should read "process."
Column 2, line 36, "filed" should read "field"
         line 43, "board" should read "board."
         line 44, "enclosure" should read "enclosure."
Column 3, line 5, "operations" should read "operations."
Column 4, line 19, "ends" should read "ends."
Column 6, line 55, "its" should read "it"
         line 66, "ILL" should read "IL"
Column 7, line 23, "filter" should read "filter."
         line 37, "12" should read 12."
Column 8, line 11, "102" should read "103"
         line 26, "at a angle" should read "at a right angle"
         line 27, "means of a fastener" should read "means of a suitable fastener"
         line 28, "116" should read "116."
         line 29, "means of a 122" should read "means of a card guide 122"
         lines 29-30, "side 79 of card" should read "side 79 of a card cage 70."
         line 47, "necessary" should read "necessary."
         lines 47-48, "Rando memory" should read "Random access memory"
         line 56, "may also used" should read "may also be used"
         line 64, "as from Planar System" should read "as the FPC-AT Planar System"
Column 9, line 3, "inputs or output" should read "inputs or outputs"
         lines 3-4, "functions" should read "functions."
         line 45, "input" should read "input."
         line 49, "spikes" should read "spikes."
Column 10, line 10, "welded" should read "welded."
         lines 21-22, "data is obtain" should read "data are obtained"
         line 68, "from Analog devices," should read "from Analog Devices,"
Column 11, line 13, "typical" should read "typical."

UNITED STATES PATENT AND TRADEMARK OFFICE
CERTIFICATE OF CORRECTION

PATENT NO.  : 5,305,183
DATED       : April 19, 1994
INVENTOR(S) : Teynor

It is certified that error appears in the above-indentified patent and that said Letters Patent is hereby corrected as shown below:

Column 11, line 13, "typical" should read "typical".

This certificate supersedes Certificate of Corrections issued November 1, 1994 and January 3, 1995.

Signed and Sealed this

Twenty-fourth Day of January, 1995

Attest:

BRUCE LEHMAN

Attesting Officer

Commissioner of Patents and Trademarks